Figure 4:
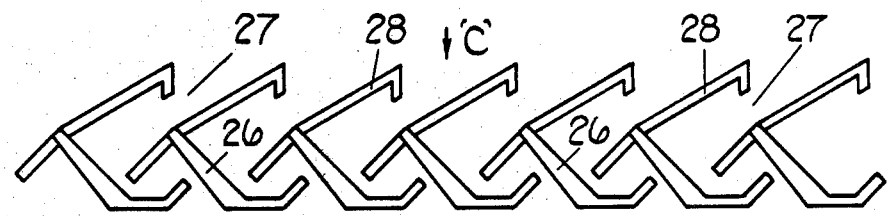

United States Patent [19]

Goodall

[11] 4,290,619
[45] Sep. 22, 1981

[54] SPRAY INHIBITING MEANS FOR USE ON A ROAD VEHICLE

[76] Inventor: Maurice Goodall, Silverhill, Barton-under-Needwood, Burton-upon-Trent, Staffordshire, England

[21] Appl. No.: 24,515

[22] Filed: Mar. 28, 1979

[51] Int. Cl.³ .............................................. B62D 25/16
[52] U.S. Cl. .............................................. 280/154.5 R
[58] Field of Search ................. 280/154.5 R, 154.5 A, 280/152 R, 153 R

[56] References Cited

U.S. PATENT DOCUMENTS

| | | | |
|---|---|---|---|
| 3,285,624 | 11/1966 | Aber et al. | 280/154.5 R |
| 3,341,222 | 9/1967 | Roberts | 280/154.5 R |
| 3,582,108 | 6/1971 | Carlton | 280/154.5 R |
| 3,834,732 | 9/1974 | Schons | 280/154.5 R |
| 4,192,522 | 3/1980 | Morgan | 280/154.5 R |

Primary Examiner—Joseph F. Peters, Jr.
Assistant Examiner—Michael Mar

[57] ABSTRACT

This invention relates to spray-inhibiting screen (such as 15) for use on a road vehicle, which is adapted in use to be mounted rearwardly of and adjacent to a vehicle tire so that in wet conditions the screen will intercept spray and water thrown rearwardly by the tire, there also being provided a conduit (24) for collecting such water intercepted by the screen, and an outlet (25) for discharging the collected water from the vehicle at such a velocity relative to the vehicle velocity that water deposited by the discharging outlet (25) on to the road surface will have no or only a low velocity in a horizontal direction relative to the road surface itself.

4 Claims, 15 Drawing Figures

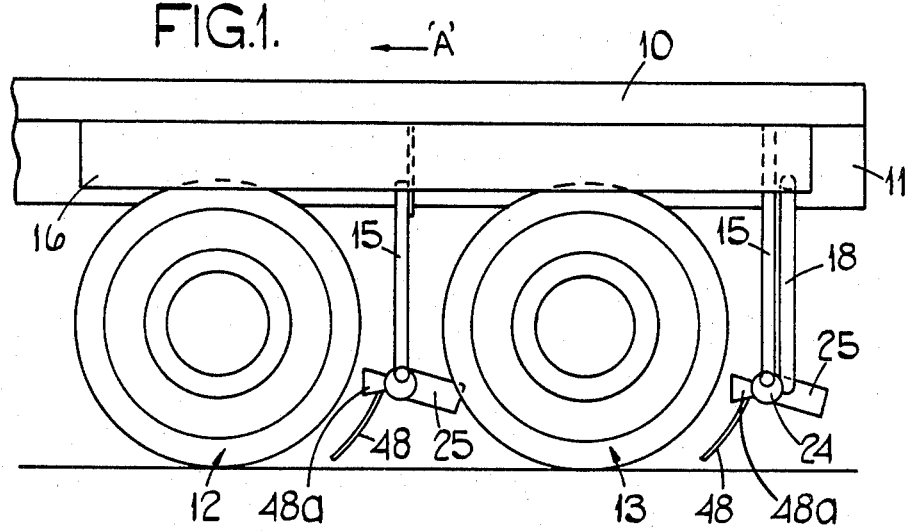
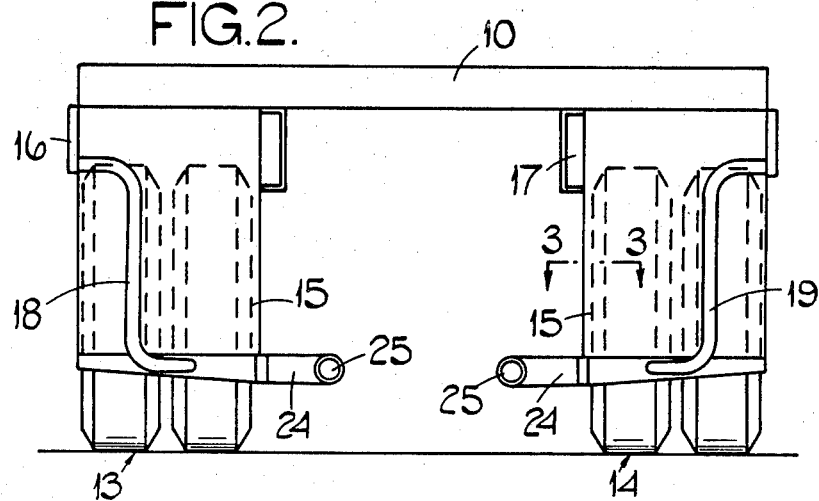
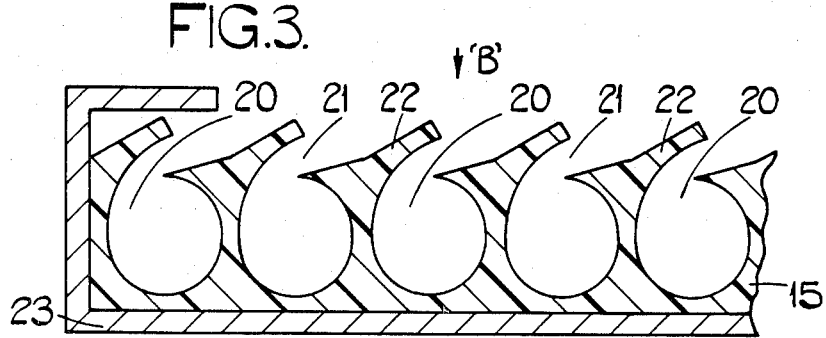

SPRAY INHIBITING MEANS FOR USE ON A ROAD VEHICLE

This invention relates to means for inhibiting the formation of spray behind a road vehicle when the latter is travelling in wet conditions, the object of the invention being to provide such means in an improved form.

In accordance with the invention there is provided, for use on a road vehicle, spray inhibiting means which comprises a screen adapted to be mounted adjacent to a vehicle tire so as to be capable of intercepting water which, in wet conditions, will be thrown off said tire, means for collecting such water intercepted by said screen, and means for discharging the collected water from the vehicle at such a velocity relative to the vehicle velocity that water deposited on the road surface by said discharging means will have no or only a low velocity in a horizontal direction relative to said road surface.

In one embodiment said water collecting means is arranged also to collect air by means of a ram effect as said spray-inhibiting means moves in use over the road surface with the associated vehicle, the arrangement being such that the collected air will have a pressure which is greater than atmospheric pressure and which will act to blow the collected water rearwardly of the vehicle.

Alternatively said water discharging means may include a pump which in use may be driven by a vehicle wheel and which is arranged so that the velocity of the water discharged by the pump is proportional to the rotational speed of said wheel. As a further alternative said water discharging means may include an air compressor which in use is driven by a vehicle wheel so as to provide pressurised air for discharging said collected water rearwardly. As another alternative said pump may be driven by an hydraulic motor.

Conveniently said screen is formed with a plurality of elongate passages arranged in a spaced parallel relationship, said elongate passages extending in use in generally vertical or horizontal directions. Said passages may be formed between a plurality of spaced parallel baffles and they may be each arranged so that they are generally of sinuous form in cross-section. Alternatively each passage may comprise a generally cylindrical bore having an inlet which extends along the length of the passage and which opens into one face of the screen.

Figure 7:
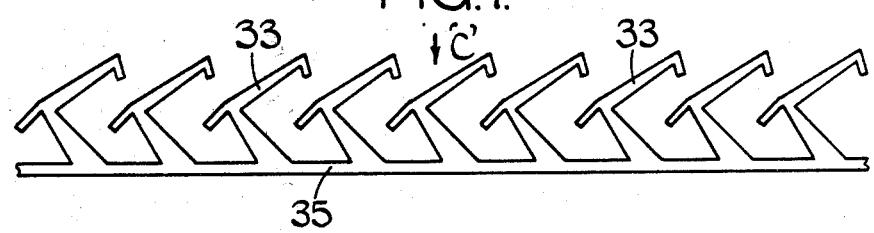
Figure 8:
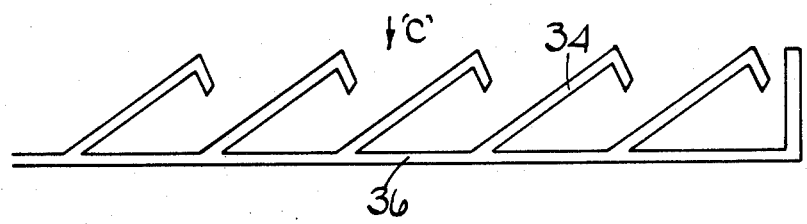
Figure 9:
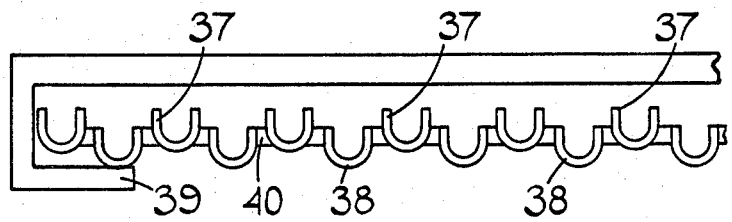
Figure 10:
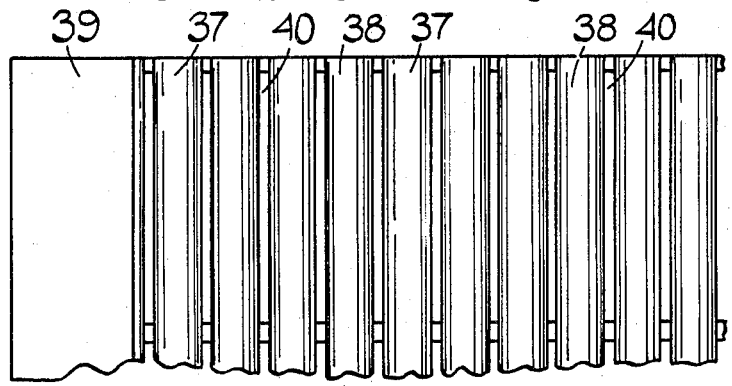
Figure 11:
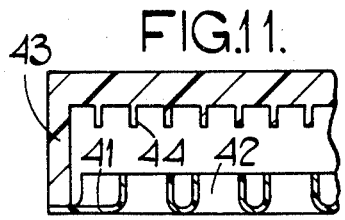
Figure 13:
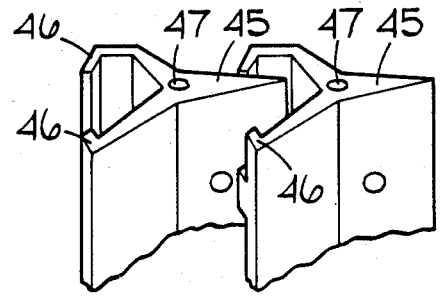
Figure 12:
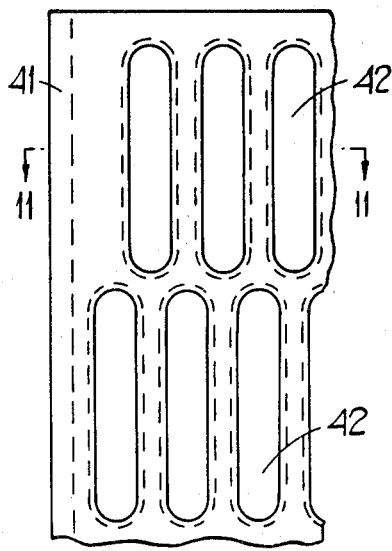
Figure 14:
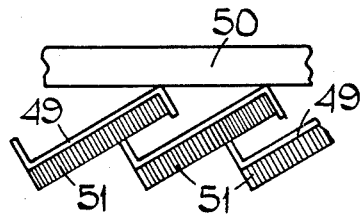
Figure 15:
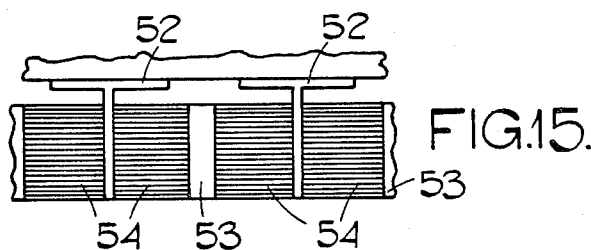

The invention will now be more particularly described with reference to the accompanying drawings wherein FIG. 1 is a side view showing part of a lorry fitted with one example of spray-inhibiting means constructed in accordance with the invention, FIG. 2 is an end view, looking from the rear, of the arrangement seen in FIG. 1, FIG. 3 is a partial sectional view, on an enlarged scale taken on the line 3—3 of FIG. 2, of one of the screens seen in FIGS. 1 and 2, FIGS. 4–8 are partial plan views showing respectively alternative forms of screens for use in means according to the invention, FIGS. 9 and 10 are respectively partial plan and side views of another form of screen that can be used in means according to the invention, FIGS. 11 and 12 are respectively partial sectional and side views of yet another form of screen that can be used in means according to the invention, FIG. 11 being a section taken on the line II—II of FIG. 12, FIG. 13 is a fragmentary perspective view showing part of a further alternative form of screen that can be used in means according to the invention, and FIGS. 14 and 15 are plan views showing respectively two further forms of screens that can be employed in spray-inhibiting means according to the invention.

Referring firstly to FIGS. 1 and 2 of the drawings there is shown therein part of a lorry which is indicated by reference numeral 10, the rear end of the lorry being indicated by reference numeral 11 so that in normal use the lorry will proceed in the direction of arrow 'A' indicated on FIG. 1. The lorry has four sets of rear wheels, three of these sets being indicated by references 12, 13 and 14 although of course only two such sets of rear wheels may be provided if desired. Furthermore each tire set may comprise only one tire instead of twin tires as shown.

Associated with each tire or tire set is spray-inhibiting means which includes a screen generally indicated in FIGS. 1 and 2 by reference numeral 15, said screen being mounted from the underside of the lorry body so as to be capable of intercepting water which, in wet conditions, will be thrown rearwardly from said tire. As shown in FIGS. 1 and 2 there is also provided on each side of the lorry a screen 16 or 17 into which the upper parts of the tires will project so that water thrown upwardly from the tires will be trapped by said screen 16 and 17 and will then flow towards the rear ends thereof. Each screen is provided with a discharge pipe 18 or 19 and each such discharge pipe is connected at its lower end to the bottom of the adjacent screen 15.

A part of a cross-section of each screen 15 is shown, on an enlarged scale in FIG. 3 and in this case the screen is formed as a moulding in a synthetic resin material so as to provide a plurality of spaced parallel passages 20, each passage extending in use in a generally vertical direction and being of elongate form. Each passage 20 comprises in effect a bore of generally cylindrical configuration but along one face of the screen, namely that face which in use will be adjacent to the associated tire, each passage is formed with a longitudinally extending opening 21. Furthermore adjacent to each of said openings 21 the screen is moulded to provide guide means in the form of a surface or surfaces 22 which are inclined to said face of the screen. In use water thrown from the associated tire will be thrown rearwardly towards the screen 15 in the direction indicated by the arrow 'B' in FIG. 3 and consequently such water will enter the passages 20 via the inlets or openings 21. In addition, because said screen 15 will be moving forwardly in a direction opposite to the direction of the arrow 'B', air will also be forced through said inlets 21 into the passages 20 by means of a ram effect and consequently the passages 20 will constitute plenum chambers in which the air pressure will be increased above atmospheric pressure.

The upper ends of said passages 20 are closed by a cap (not shown) which is also conveniently moulded from a synthetic resin material and which embodies short downwardly depending cylindrical spigots which fit into said upper ends of the passages 20. The moulding containing said passages 20 is conveniently mounted in a frame or holder 23 and the lower ends of said passages 20 are connected to a conduit indicated by reference 24 (see FIGS. 1 and 2) which is closed at one end and which has at the other end a rearwardly directed water outlet 25 through which water running into said conduit 24 from the passages 20 can flow. The increased air pressure in the plenum chambers formed by said passages 20 will act to force the water from the outlets 25 and thus impart to said water a velocity relative to the forward velocity of the vehicle such that water deposited on the road surface from said outlets 25 will have no or only a low velocity in a horizontal direction relative to said road surface. In other words the horizontal velocity of the water relative to the ground which would otherwise be caused by the motion of the vehicle will be very substantially reduced and accordingly the formation of spray which would otherwise be caused by such horizontal velocity of the water will be inhibited. At the same time of course the screen itself will act to intercept spray which is thrown rearwardly from the tire so that the water in such spray will be collected and will be channelled into the conduits 24 and this in itself will also inhibit formation of spray. Preferably each of the aforementioned conduits 24 is arranged so that it has a cross-sectional area which increases in the direction towards the associated outlet 25 so that as more and more air and water flow into the conduit 24 from the passages 20 towards the outlet of the conduit, the cross-sectional area of the latter will increase to cope with the increasing volumes of air and water. The passages 20 thus act to collect water intercepted by each screen, whereas the conduits 24 and outlets 25 together with the aforementioned increased air pressure arising from a ram effect will discharge the collected water onto the road surface in a way in which the horizontal velocity of such discharge water is very substantially reduced or stopped altogether as explained above.

As an alternative to relying on the aforementioned ram effect, there may be provided, in association with each vehicle tire, a pump (not shown) which may be driven by an hydraulic motor or conveniently by the vehicle tire and which is arranged to pick up water flowing down the associated screen and then discharge such water rearwardly so as again to destroy the whole or substantially the whole of the horiziontal velocity of such water before it reaches the road surface. In such an arrangement the velocity of the water discharged by the pump can be arranged to be proportional to the rotational speed of the vehicle tire. As a further alternative there may be provided instead of the aforesaid pump, an air compressor which can again be driven by the vehicle tire so as to supply pressurised air which is again used to blow the collected water rearwardly from the vehicle so as again to destroy or substantially destroy its horizontal velocity relative to the road surface.

FIGS. 4, 5, 6, 7 and 8 show respectively in plan view alternative forms of screens which can be made from a synthetic resin material or from metal or rubber or any other convenient material. FIG. 4 shows a plurality of spaced parallel baffles 26 which provide between them elongate generally vertically extending passages 27 which are of sinuous form in cross-section, the surfaces 28 serving to guide spray directed on to the screen in the direction of the arrow 'C' into said passages 27. Associated with the screen shown in FIG. 4 there may be provided a backing member (not shown) which would engage or lie closely adjacent to the rearward edges of said baffles 26, the arrangement being such in any case that most if not all of the water collected by the screen and some at least of the air which is also collected by the screen will flow down said passages 27 to a conduit which extends along the bottom thereof in a manner similar to that previously described in connection with the screen shown in FIGS. 1, 2 and 3.

Figure 5:
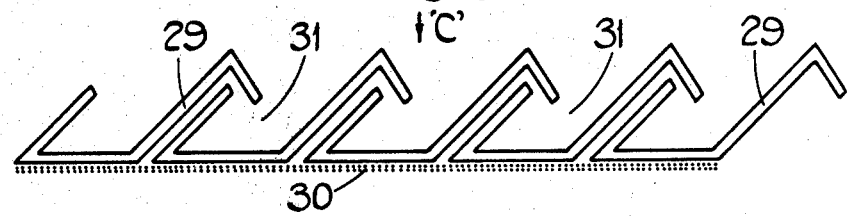

FIG. 5 shows an alternative form of baffle indicated by reference numeral 29 and in this case there may be provided a backing member in the form of a mat 30 which is formed of fibrous material, the fibres of the mat conveniently extending in vertical directions or, in the case of stiff fibres they could extend in horizontal directions. The mat will permit most of the air to pass through the screen and most of the water will be trapped in the passages 31 which will also collect air at a pressure which will be greater than atmospheric pressure.

Figure 6:
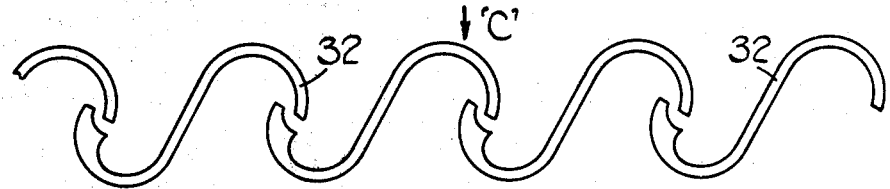

FIG. 6 shows yet another alternative form of screen made up by baffles 32 which would be mounted in any convenient form of frame or holder. FIGS. 7 and 8 show two further alternative forms in which the baffles 33 or 34 are integrally connected together at their rearward edges to form along said rearward edges a backing member 35 or 36.

FIGS. 9 and 10 show respectively in plan and side views yet another form of screen that can be used in means according to the invention, this embodiment having one series of spaced baffles 37 and another series of spaced baffles 38 which alternate with the baffles 37, the latter being set in a row which lies somewhat to the rear of the baffles 38. These baffles are set in a frame or holder 39 and elongate passages 40 are formed between the baffles through which air and water can pass into the screen for subsequent discharge from the bottom of the screen.

FIGS. 11 and 12 show respectively in sectional plan view and side view another form of screen and in this case there is provided a front member 41 which may be formed of a synthetic resin material and in which there is formed a plurality of elongate apertures 42. Said member 41 is secured to a body 43 formed with a series of internal elongate baffles 44 and said member 41 and body 43 thus form a hollow box structure which can receive air and water thrown up by the vehicle through said apertures 42. FIG. 13 is a fragmentary perspective view of yet another form of screen which is made up of a series of spaced baffles such as are indicated by reference numeral 45. These baffles are of generally Y-shaped configuration in cross-section and are each provided with a pair of inturned lips 46. The baffles 45 may be made from a synthetic resin material or from metal or any other convenient material and they may be mounted on rods (not shown) which in use will extend through longitudinal extending apertures 47 formed in the baffles. As shown in FIG. 13 these baffles are so spaced that elongate passages are formed between them, these passages having a generally sinuous configuration in cross-section so that they will trap most of the water but will permit some air to pass through the screen.

If desired, any of the above-mentioned screens may be used in conjunction with a deflector plate 48 (see FIG. 1) which is connected to the lower part of the screen so as to depend therefrom, said plate being inclined to the vertical in such a way as to intercept spray which is directed rearwardly by the adjacent wheel in a direction lying close to the road surface, such intercepted spray then being directed upwardly on to the screen. Furthermore, in cases where the air passing downwardly with the collected water into the conduit 24 and outlet 25 of the screen is not sufficiently pressurised to eject the water rearwardly at a high enough velocity to arrest its absolute rearward velocity, additional pressurised air may be provided by a forwardly divergent air nozzle 48a (see FIG. 1) which collects air by means of a ram effect and then delivers it to the conduit 24 or outlet 25.

FIG. 14 is a plan view showing another form of screen that may be used in spray-inhibiting means constructed in accordance with the invention, and in this case the screen comprises a plurality of baffles 49 which are of Z-shaped configuration in cross-section, said baffles being arranged in a spaced parallel relationship (to provide between them passages of sinuous cross-section) within a holder or frame 50. Each baffle is provided on its forwardly presented face a filter element 51 having a plurality of generally horizontally extending bristles or blade-like elements which will arrest the water from the spray thrown against the screen whilst most of the air from the spray passes rearwardly through the screen. The water thus collected will then fall downwardly to a conduit and discharge outlet (not shown) whilst pressurised air for ejecting the water rearwardly will desirably be provided by means for example of a forwardly directed nozzle as above-mentioned.

FIG. 15 shows yet a further alternative form of screen which has spaced baffles 52 which are each of T-section. There is also provided a plurality of filter elements which each comprise a support 53 from each side of which project horizontally extending bristles or blade-like elements 54 which again collect the water whilst permitting most of the air to pass rearwardly between the baffles 52. The collected water runs down the screen and is ejected rearwardly as is above-described with reference to FIG. 14.

Any of the screens above described may, if desired, be provided at each side with a forwardly projecting side screen (not shown) which will assist in guiding the spray onto the forward face of the main or supplementary screen with which said side screens are associated. Furthermore if desired a small gap may be formed between the rear of each side screen and the adjacent part of the associated screen, each such gap being covered if desired by means of a filter which is arranged to intercept water directed towards the gap but which will allow a certain amount of air to pass through the gap in order to prevent too great a build up of air pressure within the space bounded by the two side screens and the associated main or supplementary screen. Each of said filters may be formed for example by means of a brush-like member having bristles or like members which will intercept the water but allow some air to pass through.

It is of course to be understood that spray-inhibiting means in accordance with the invention may also be used to inhibit the spray arising from the front as well as the rear wheels of vehicles. Furthermore, in all cases it is desirable to arrange that the collected water is ejected from a position which is laterally offset from the associated tire because of air eddies which occur directly behind said tire.

I claim:

1. Spray-inhibiting means for use on a road vehicle, said means comprising a screen adapted to be mounted adjacent to a vehicle tire so as to be capable of intercepting air and water spray which, in wet conditions, will be thrown off said tire, collecting means for collecting such air and water intercepted by said screen, said collecting means including means for increasing pressure on said collected air and water spray, and discharging means for discharging the collected water from the vehicle, said discharging means being directed rearwardly of the vehicle so that vehicle velocity is subtracted from water discharge velocity so water is discharged at such a velocity relative to the vehicle velocity that water deposited on the road surface by said discharging means will have zero or only a low velocity in a horizontal direction relative to said road surface.

2. Spray-inhibiting means as claimed in claim 1 wherein said screen is formed with a plurality of elongate passages arranged in a spaced parallel relationship.

3. Spray-inhibiting means as claimed in claim 2 wherein said elongate passages are formed between a plurality of spaced parallel baffles.

4. Spray-inhibiting means as claimed in claim 3 wherein said elongate passages are each of generally sinuous form in cross-section.

* * * * *